Sept. 8, 1964

H. E. KELCHNER 3,147,633

MECHANICAL MOVEMENT

Filed April 26, 1962

INVENTOR.
HARLEY E. KELCHNER

BY Carl Fissell Jr.

AGENT

Sept. 8, 1964         H. E. KELCHNER         3,147,633
                      MECHANICAL MOVEMENT
Filed April 26, 1962                          7 Sheets-Sheet 2

INVENTOR.
HARLEY E. KELCHNER
BY
*Carl Fissell Jr.*
AGENT

Sept. 8, 1964      H. E. KELCHNER      3,147,633

MECHANICAL MOVEMENT

Filed April 26, 1962      7 Sheets-Sheet 3

INVENTOR.
HARLEY E. KELCHNER
BY
Carl Fissell Jr.
AGENT

Sept. 8, 1964     H. E. KELCHNER     3,147,633
MECHANICAL MOVEMENT
Filed April 26, 1962     7 Sheets-Sheet 4
a     b     c
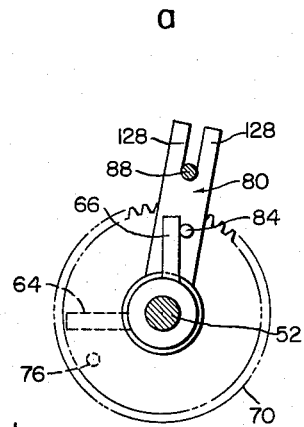
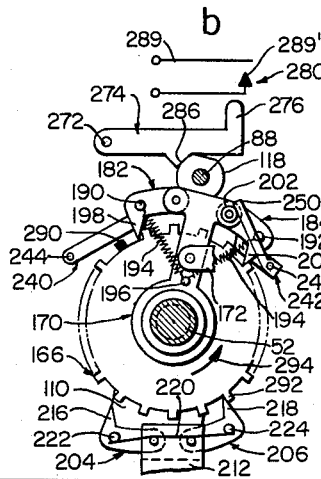
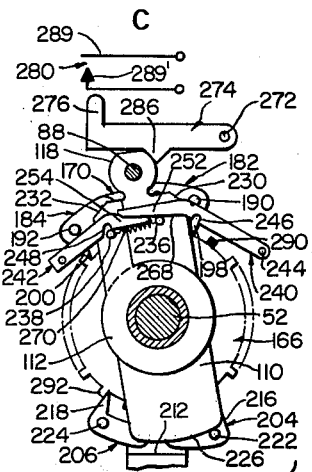
Fig.10
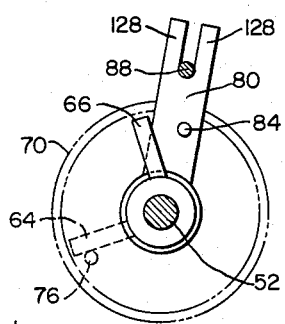
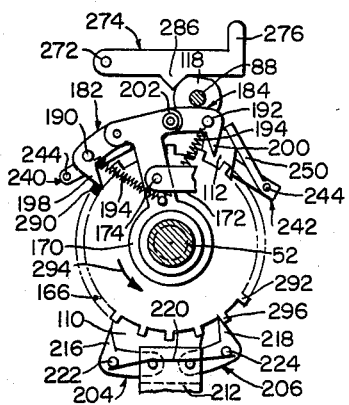
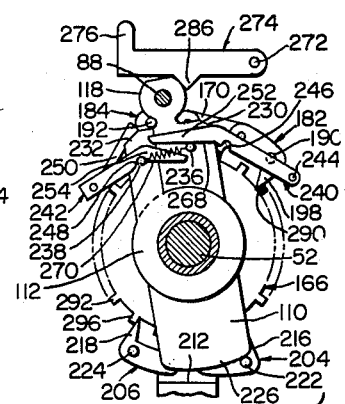
Fig.11
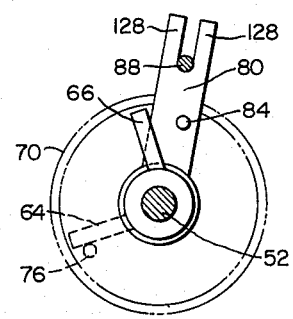
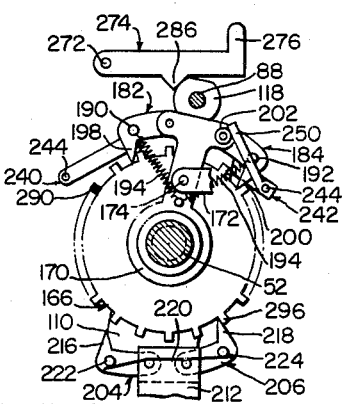
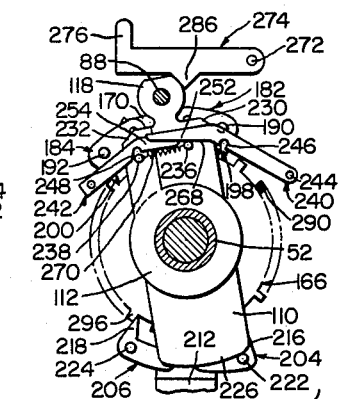
Fig.12
INVENTOR.
HARLEY E. KELCHNER
BY *Carl Fissel Jr.*
AGENT Sept. 8, 1964  H. E. KELCHNER  3,147,633
MECHANICAL MOVEMENT
Filed April 26, 1962  7 Sheets-Sheet 5
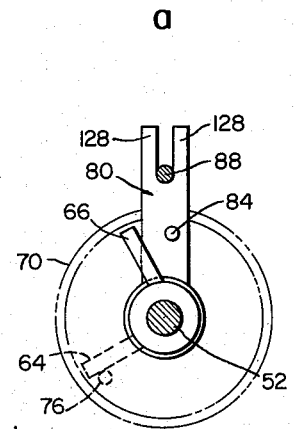
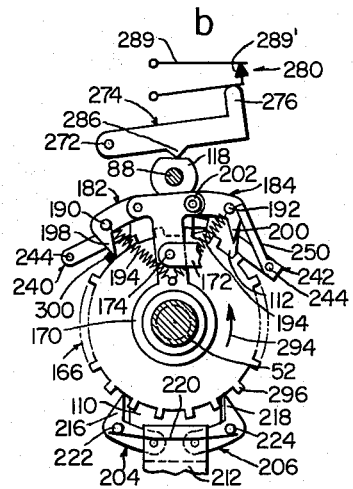
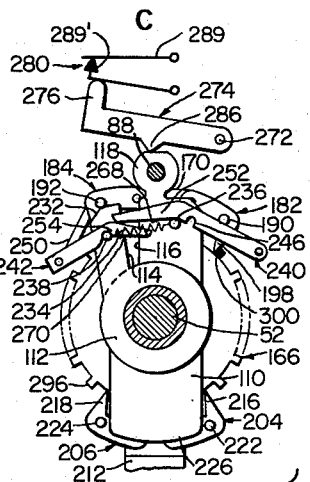
Fig.13
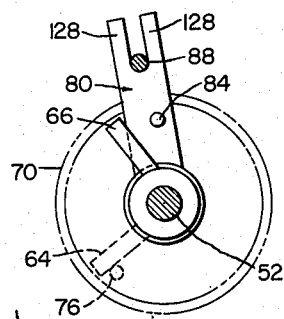
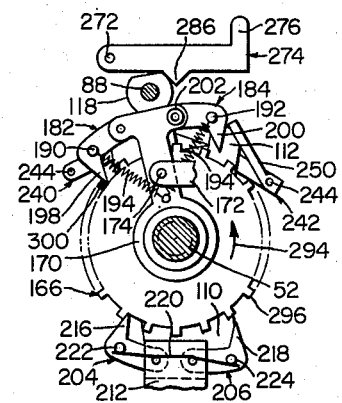
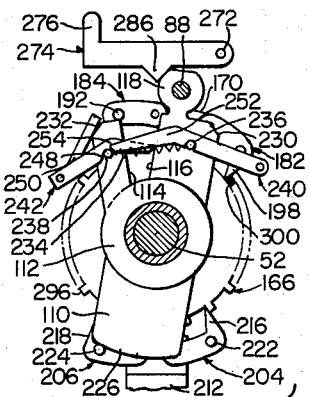
Fig.14
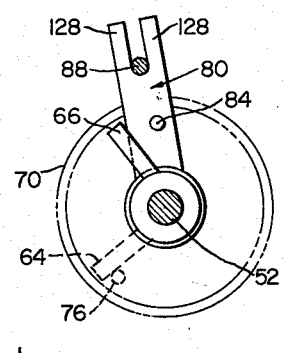
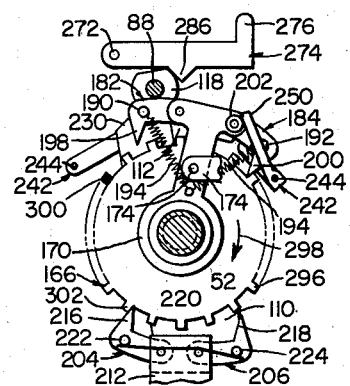
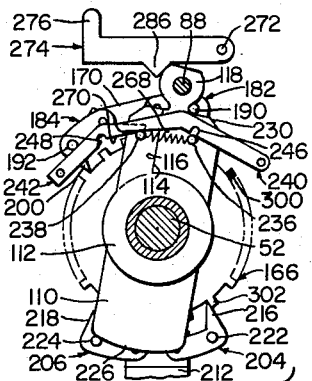
Fig.15
INVENTOR.
HARLEY E. KELCHNER
BY
AGENT

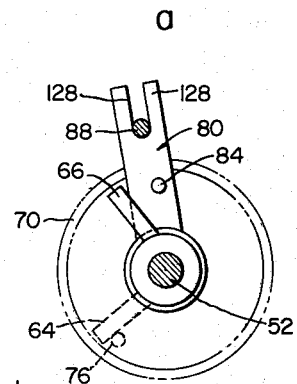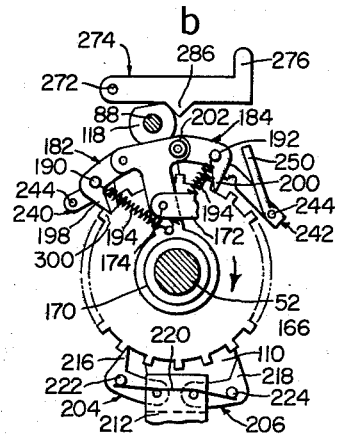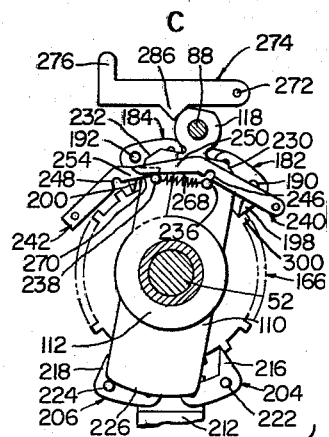
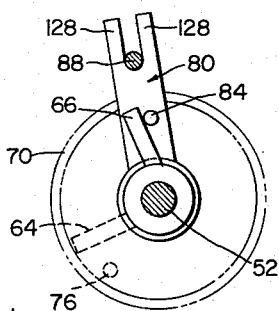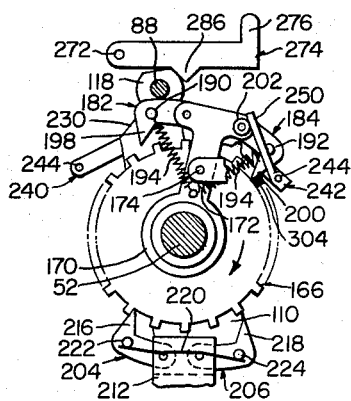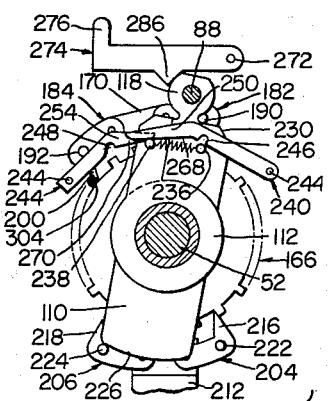
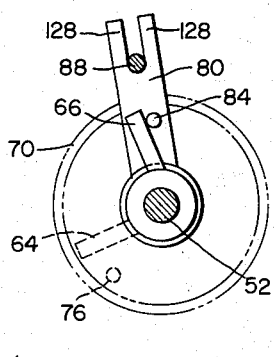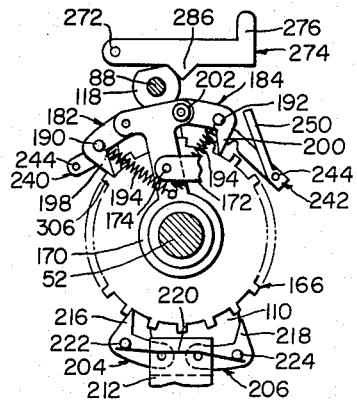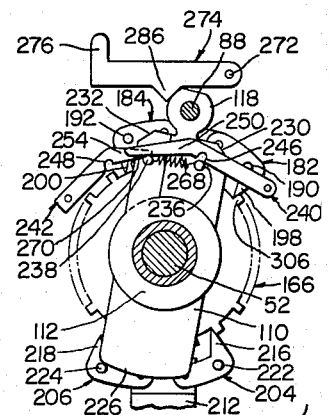

INVENTOR.
HARLEY E. KELCHNER
BY
Carl Fissell Jr.
AGENT 3,147,633
MECHANICAL MOVEMENT
Harley E. Kelchner, King of Prussia, Pa., assignor to Burroughs Corporation, Detroit, Mich., a corporation of Michigan
Filed Apr. 26, 1962, Ser. No. 199,500
14 Claims. (Cl. 74—142)

This invention relates to mechanical motion producing apparatus and more particularly, to apparatus for converting unidirectional step-by-step rotary or oscillatory motion into bidirectional rotary step-by-step motion for actuating a counting device, such for example, as a batch counter of the type which may be used to count the total number of lines of typed information resulting from a printing operation, or to indicate the desired or required total number of lines for advancing a paper platen for printing or other type apparatus.

Electronic batch counters which are used in high speed accounting devices such as computers, are relatively expensive to fabricate and maintain. For lower speed type apparatus an accurate, easily settable repeatable mechanical counter is highly desirable. However, many of the available lower speed mechanical counters do not perform satisfactorily and many such devices cannot be set to repeat any desired number or batch in a clockwise as well as a counterclockwise direction.

The present apparatus is relatively simple in construction and is adaptable for repeated operation, bidirectionally, after any integral number within its range. This number may be entered or set into the apparatus by the operator of the device and such adjustment requires only a few seconds. The present invention operates in either a clockwise or counterclockwise direction and will continue to repeat indefinitely if desired.

It is an object of the present invention to provide a reversible step-by-step indicator mechanism.

It is an additional object of the invention to provide a resettable stepping mechanism which has provision for repeating the steps indefinitely.

It is another object of the invention to provide a stepping counter-indicator mechanism for use with a printing apparatus which will indicate the line of print to which the printing mechanism is to be positioned at the beginning and at the end of any operation of such equipment.

Still another object of the invention is to provide a reversing mechanism integral with a counter-indicator mechanism whereby the mechanism may be caused to step a definite preset number of steps after which the mechanism automatically reverses and steps the same number of steps in the opposite direction.

In accordance with the foregoing objects and first briefly described the present invention comprises a stepping mechanism including a driving linkage which is caused to move a pawl carrying arm arcuately to and fro in a manner such that its oppositely disposed pawls are alternately engageable with the teeth of a rotatable castellated or toothed ratchet wheel and wherein a threaded helix carrying a pair of oppositely disposed reversing arms operably associated therewith is adapted to move a gear and rider assembly threadedly disposed on the helix intermediate the arms back and forth relative to one another causing a presettable device to indicate the end of each count or batch of individual items, lines or units, etc., and in which relative movement of the reversing arms in response to reciprocation of the operating linkage, enables the apparatus to automatically repeat its stepping cycle but in an opposite direction, e.g., subtract backwardly from the initial count. Electrical indicating means is operably associated with the apparatus for indicating the termination of a stepping cycle.

With these and other objects in view, the invention consists of certain novel features of construction, as will be more fully described and particularly pointed out in the appended claims. In the accompanying drawings:

Figure 6:
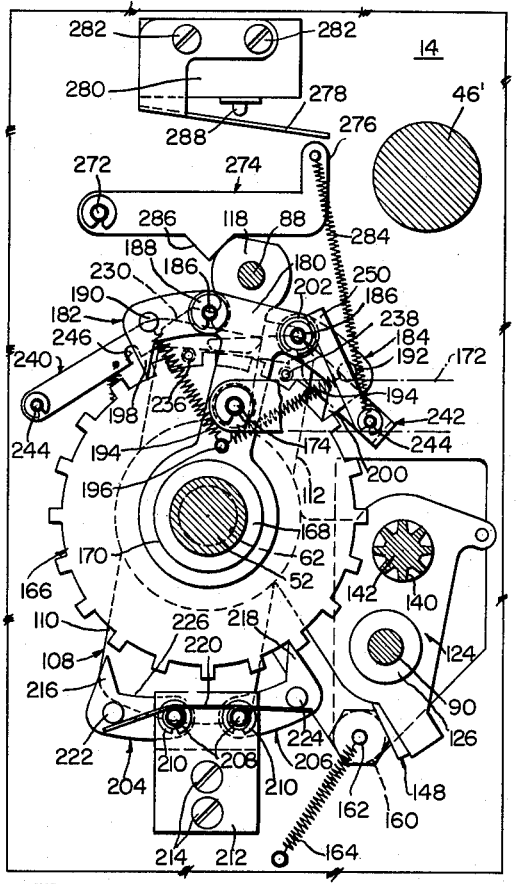
FIG. 6 is a view partially in section along the lines 6—6 of FIG. 3.
Figure 7:
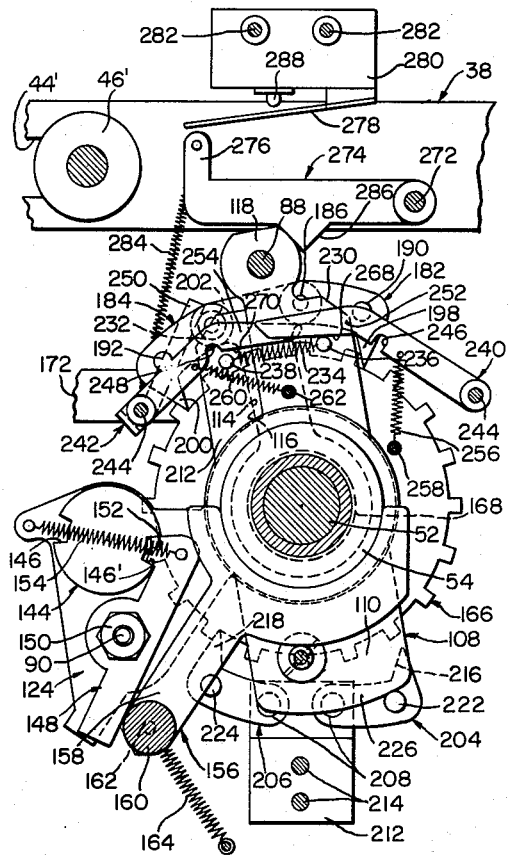
FIG. 7 is a view similar to FIG. 6 taken along line 7—7 of FIG. 3.
Figure 9:
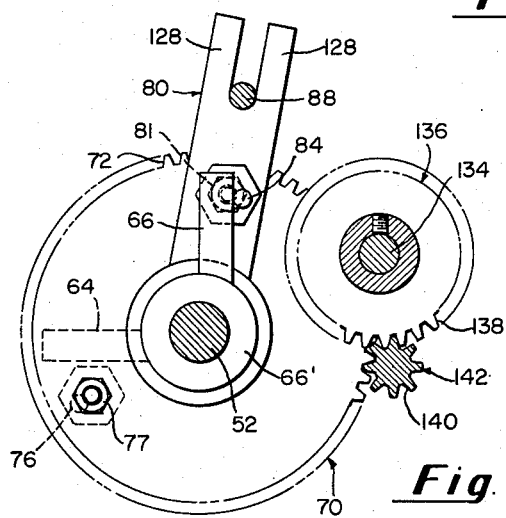
FIG. 9 is a sectional view along the line 9—9 of FIG. 3.
Figure 19:
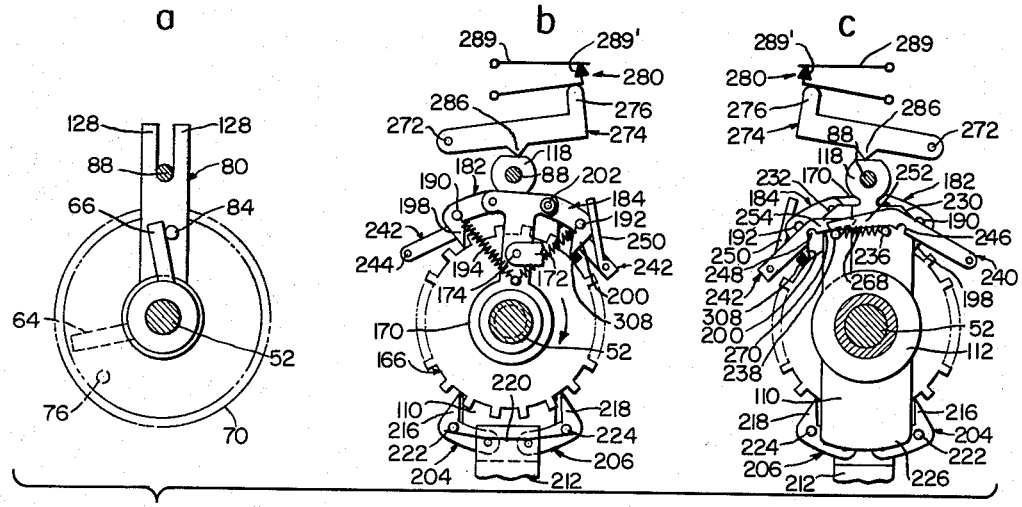
Figure 20:
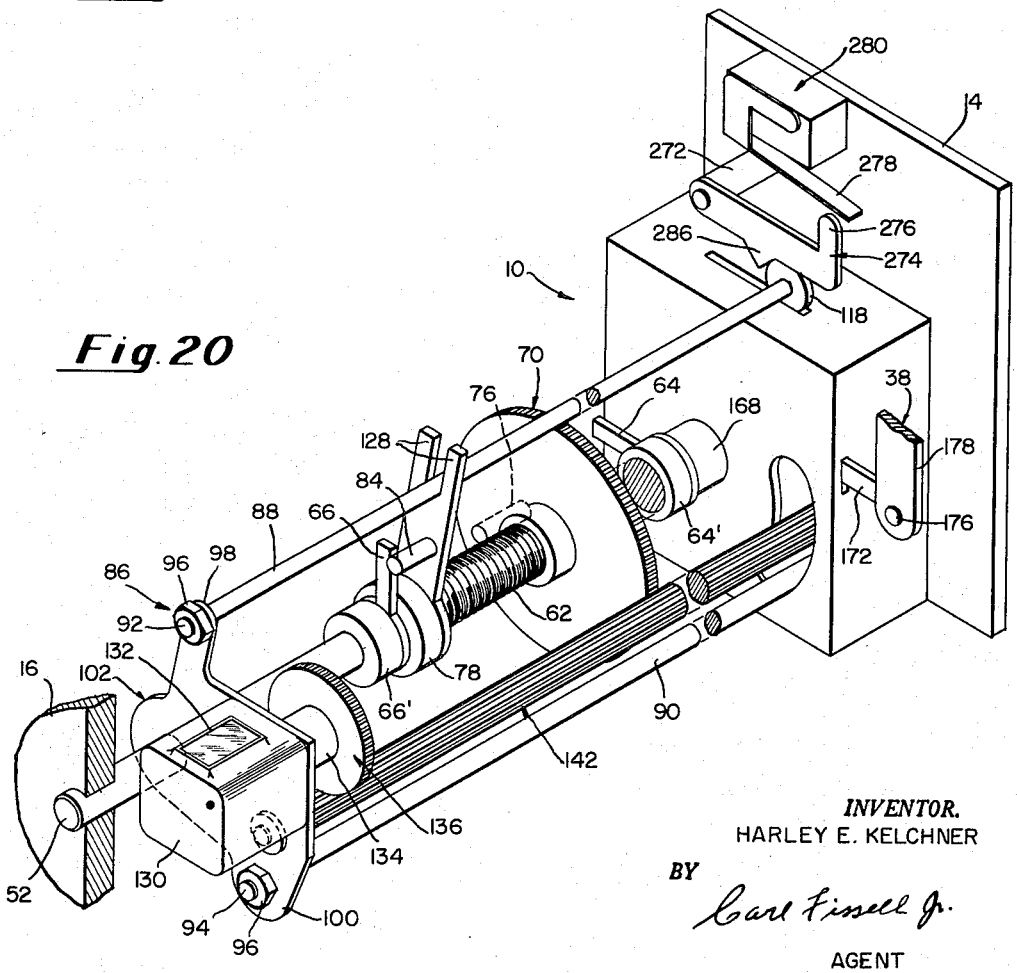

FIGS. 10 through 13 inclusive are operational schematic views of parts of the apparatus shown in FIGS. 6, 7 and 9 illustrating the steps required to make the count of two;

FIGS. 14 through 19 are views similar to FIGS. 10 through 13 but drawn to illustrate the count of two in the reverse direction; and FIG. 20 is an isometric pictorial view of the indexing mechanism for the present apparatus.

The present apparatus finds employment in printing apparatus where for example, it is desirable or required to count every line that the printer has spaced its platen and thereafter to indicate by some sort of signal, electrical or mechanical, that the line spacing operation is completed. Thus this invention could be used as a synchronizing device with a printer to indicate the first line which is to be typed upon or that the last line has already been typed upon and that the platen should now space itself "*n*" number of lines for the next printing operation or cycle. The present invention includes means for increasing or decreasing the limits to which the device may be set to count. This limit is governed by certain of the cooperating elements of the apparatus in such fashion that the size or limit of the count is controlled as a practical matter by the size of certain of the elements of the apparatus.

Figure 1:
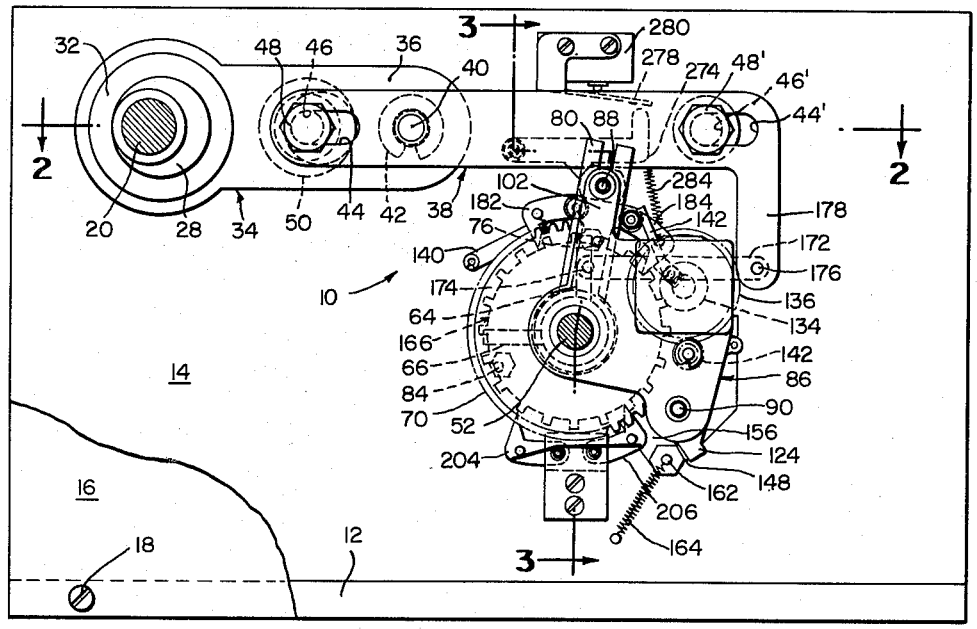
FIG. 1 is a front elevational view of a preferred form of apparatus incorporating the present invention.
Figure 2:
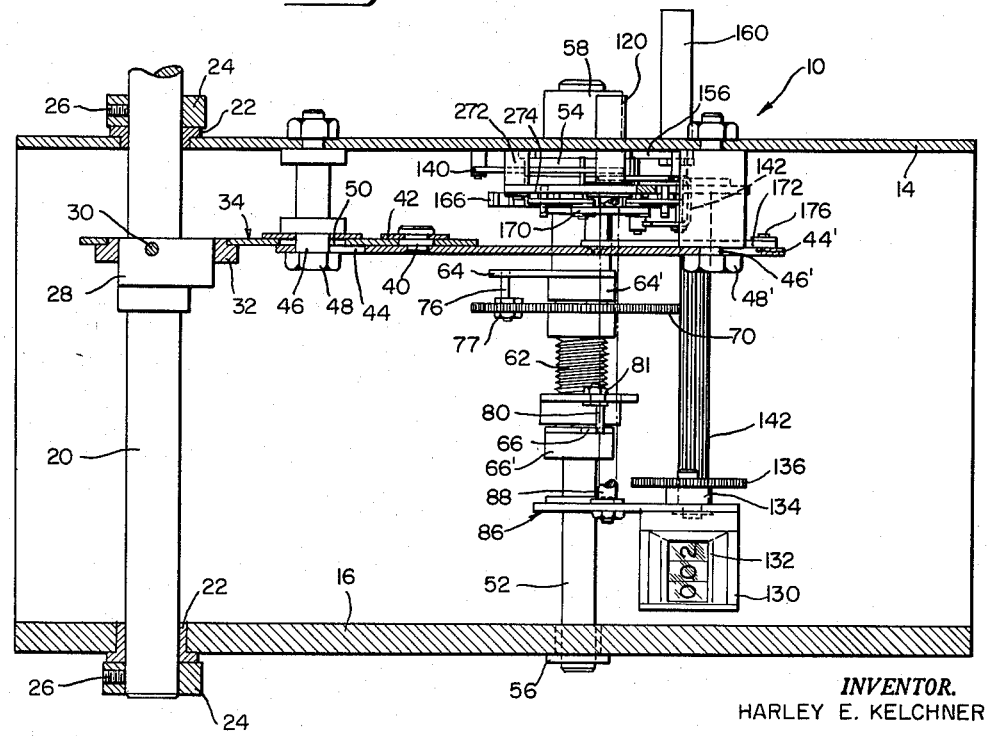
FIG. 2 is a top plan view along the line 2—2 of FIG. 1.

The preferred embodiment of the present invention is seen by reference to FIGS. 1, 2, 3 and 20 to include rectangular framework 10 including a base member 12 of rigid material, such for example, as metal, from which oppositely disposed front and rear wall-forming members 14 and 16 respectively, project vertically. The wall members 14 and 16 are attached to the base member as by bolts 18, one of which is shown in FIG. 1, passing through the wall member 14 threadedly secured to the base member 12. Other parts of the apparatus, as hereinafter described, are either supported in varying fashion on the oppositely disposed wall members or are supported by other members which in turn are supported on or by the wall members 14 and 16. A main driving shaft 20 for the apparatus extends between both walls and projects slightly therebeyond. Each end of shaft 20, is, as seen in FIG. 2, journalled for rotation in a bushing 22 and is retained against accidental longitudinal dislodgement by means of oppositely disposed collars 24 and set screws 26. Drive shaft 20 may be rotated by means of externally applied rotative torque, such for example, as the main drive of the apparatus with which it may be associated, e.g., a printer or, it may be rotated by hand, or by other driving means not shown herein. For purposes of the present description the drive is or may be intermittent in either or both clockwise or counterclockwise directions.

Secured to the main driving shaft 20, intermediate its ends and adjacent the front wall forming member 14 is an eccentric member 28 attached to the shaft by means of a set screw 30, FIG. 2, and rotatable in bearing 32 press-fitted for example, in an eccentric driving arm 34. The rightward extending portion 36 of arm 34 is secured to an elongated L-shaped connecting rod 38 by means of an attaching pin 40 extending therethrough and a C-ring 42. The connecting rod 38 is rectilinearly reciprocable relative to the shaft 20 by means of oppositely disposed slots 44 and 44' therein through which the pedestals 46 and 46' project, and into which the bolts 48 and 48' are threaded. An enlarged circular opening 50 in the eccentric driving arm 34 permits the eccentric arm to move angularly relative to rod 38. Rotation of the main shaft 20 thus will rotate the eccentric 28 causing the eccentric drive arm 36 to move whereby to move connecting rod 38 back and forth rectilinearly, rightwardly and leftwardly, in FIG. 1, relative to shaft 20.

Figure 3:
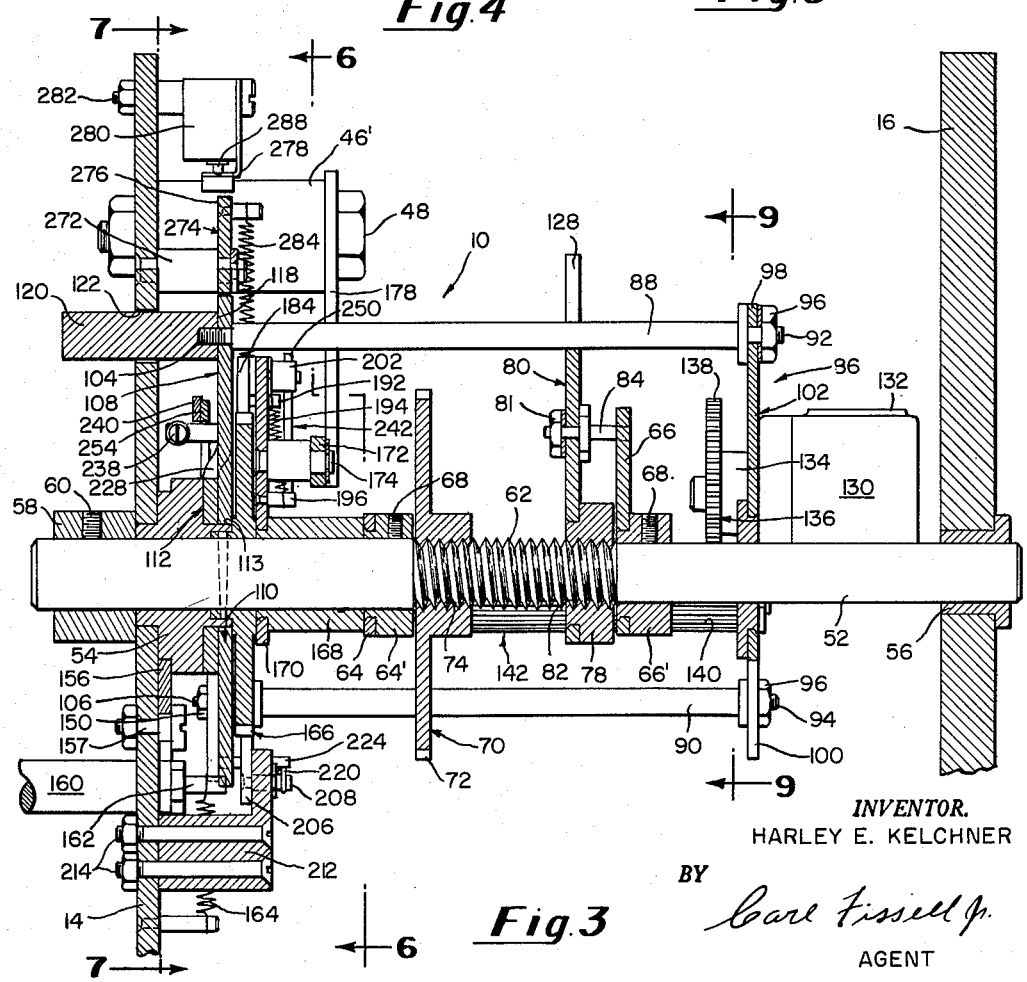
FIG. 3 is a sectional view along the line 3—3 of FIG. 1.

A secondary shaft 52 is supported at its opposite ends in the wall forming members 14 and 16 by means of front and rear bushings 54 and 56 respectively, FIG. 3, and is secured against dislodgement by means of the collar 58 and set screw 60 adjacent the front wall. Shaft 52 is provided with a spiral or helically threaded portion 62, intermediate its ends, for purposes to be explained hereinafter. The threaded helix 62 is seen to extend for a fixed distance along the shaft 52 but may actually be longer or shorter than shown depending on the desired total count to be employed by the present apparatus. Thus the shaft may be adjustably threaded for any particular item count.

Figure 4:
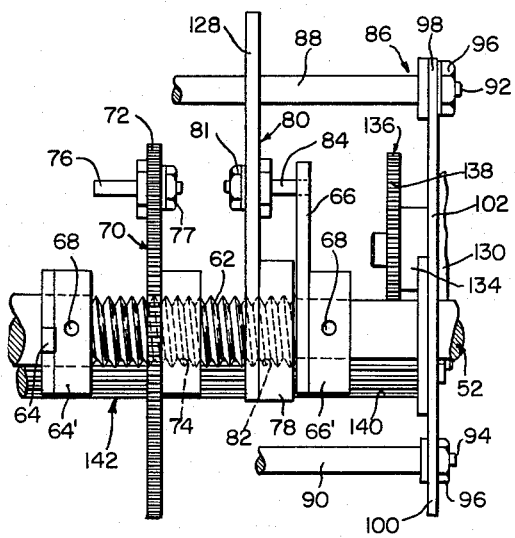
FIG. 4 is a sectional view of the reversing mechanism in its starting position.
Figure 5:
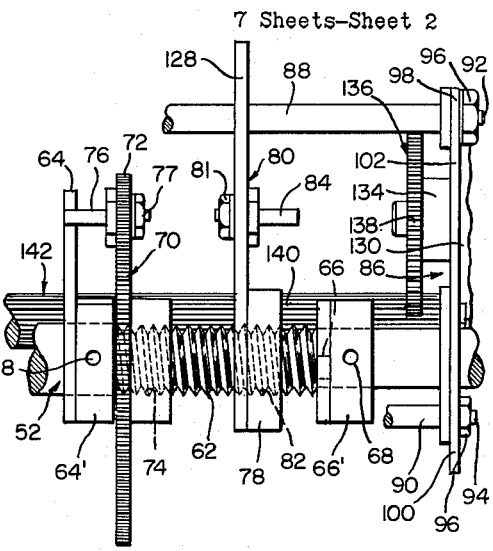
FIG. 5 is a sectional view similar to FIG. 4 of the reversing mechanism in its terminal position.

Inboard and outboard reversing arms 64 and 66, FIG. 2, the operation of which will be pointed out hereinafter, are carried on hubs 64' and 66' respectively, secured to shaft 52 adjacent opposite ends of the helically threaded portion 62 by means of pins 68. The arms 64 and 66 are disposed on shaft 52, e.g., 90° relative to one another, for purposes to be explained shortly. Adjacent the front reversing arm 64 is a large gear wheel 70 having teeth 72 thereon and being provided with an internally threaded bore 74 engageable with the threaded helix 62 and movable therealong as will appear more fully hereinafter. The wheel 70 carries an eccentric projecting pin 76, FIGS. 2, 4 and 5, near its outer periphery secured thereon by means of a nut 77, FIGS. 4 and 5, in a manner such that rotary movement of wheel 70 along shaft 52 in one direction will cause pin 76 to intersect the path of movement of the arm 64 and abut the same, for purposes to be explained presently. Adjacent the rear reversing arm 66 is a hub 78 carrying an elongated rider member 80, press-fitted thereon, provided with a threaded bore 82 engageable with and movable along the helix 62. An eccentric pin 84 secured to the rider 80 by means of the nut 81 is movable into and out of the path of rotation of the outboard reversing arm 66 as the latter member is rotated by shaft 52. The pins 76 and 84 are mounted for eccentric movement as seen most clearly in FIG. 4 so as to permit adjustment relative to the respective reversing arm at the time of assembly of the apparatus.

A rockable framework 86 as seen most clearly in FIG. 20, for purposes to be explained presently, includes upper and lower rod-like members 88 and 90. The right-hand threaded ends 92 and 94, FIG. 3, of which are secured as by nuts 96 to upper and lower projecting portions 98 and 100 respectively, of a batch counter frame mounting member 102. The opposite ends 104 and 106 of the rod members 88 and 90 are associated, as will now be described, with an irregularly shaped split cam mechanism 108 including a main cam 110, to which the ends 104 and 106 are secured, and a split cam 112 press-fitted to the reduced portion 113 of front bushing 54 in known fashion, with their opposite edges 114 and 116 in confronting abutting relationship as seen in FIGS. 6 and 7.

The upper rod member 88 passes into and through an enlarged camming protuberance 118 at the upper end of cam member 110 and extends slightly therebeyond, FIG. 3, and carries a projecting member or hub 120 thereon, which projects outwardly through an elongated slot or opening 122 in the front wall member 14, for purposes of initiating or terminating the action of other associated apparatus, e.g., printer, line finder etc. The lower rod member 90 is journalled in the rightwardly extending irregularly shaped portion 124, FIGS. 6 and 7, of cam 110 by means of a bushing 126. The framework 86 is thus effectively unitized and joined together by means of the members 88, 90 and cam 110 for rocking clockwise and counterclockwise movement as described hereinafter. The upper rod-like member 88 extends between the parallel legs 128—128 of the rider 80 entraining the same and causing it to be rectilinearly movable along the helix 62 as shaft 52 is rotated, and acting in the nature of a clevis.

Figure 8:
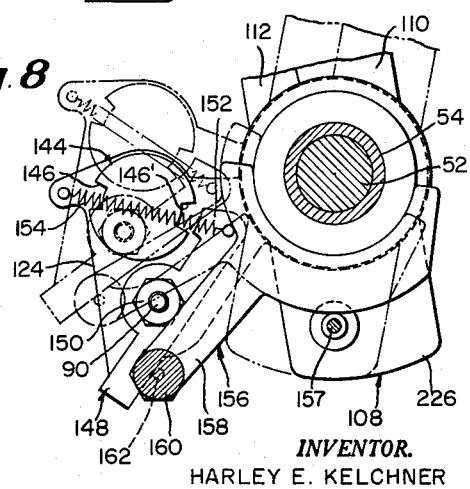
FIG. 8 is a detail view of the batch size latching mechanism of FIG. 7.

The rear frame mounting member 102 is provided with a mechanical counting mechanism 130 of known type and construction having an indicating port 132 through which the "count" can readily be set and viewed by an operator of the apparatus. The counter drive shaft 134 projects through the frame 102 and carries a gear wheel 136 thereon, the teeth 138 of which are in mesh with the teeth 140 of an elongated pinion 142 disposed intermediate the members 102 and 124, FIG. 6, and in meshing engagement with the teeth 72 of the large toothed gear wheel 70. Pinion gear 142 carries a batch size latching member 144 at one end thereof, FIGS. 7 and 8, having oppositely disposed notches 146 and 146' therein.

A stop dog 148 is pivotally mounted adjacent member 144 by means of the nut 150 threaded to the end of the lower rod member 90. The nose 152 of dog 148 is biased by means of the spring 154 in a direction to engage one of the notches 146 or 146'. The counter 130 may thus be released so as to be readily pre-set, e.g., advanced or retracted to any desired, indicated count simply by arcuately moving stop dog 148 and rotating the large gear wheel 70 by hand, for example. A Y-shaped release or batch unlatching lever 156, FIG. 8, which also performs functions to be described later on, is rotatably mounted on bushing 54 on the forward end of the shaft 52, and retained thereon by means of the bolt 157, FIG. 3. Lever 156 carries at the end of its depending leg 158 a projecting handle 160, the rear or inboard end of which is reduced to form a pin 162, FIG. 3, engageable in one of its moved positions—dotted outline—FIG. 8, with the depending end of stop dog 148 and is biased out of engagement therewith by means of spring 164. Leftward movement of handle 160 against the tension of spring 164, FIGS. 7 and 8, releases the nose 152 from one of the notches 146–146' permitting adjustment of the counter as beforementioned.

As indexable rotatable toothed or castellated ratchet wheel 166, FIG. 3, is pinned on the left end of the shaft 52 intermediate cam 110 and reversing arm 64 and in a manner to be explained presently, rotates shaft 52. A rotatable collar 168 is mounted on shaft 52 between cam 110 and arm 64 and carries a substantially T-shaped pawl driving arm 170 which is press-fitted thereto adjacent wheel 166. A short driving link 172, FIG. 1, attached at its leftward end to a pin 174 projecting from arm 170 and at its rightward end to a pin 176 projecting from the downwardly projecting end 178 of the L-shaped connecting rod 38 drivingly interconnects the two.

Carried at opposite ends of the horizontal cross arm 180 of pawl driving arm 170 are oppositely disposed actuating or driving pawls 182 and 184, left and right respectively, FIG. 6, pivoted thereto by means of pins 186 and C-ring 188. Camming pins 190 and 192 on pawls 182 and 184 project from opposite respective sides thereof. Springs 194 attached at one of their ends to the pin 196 on pawl driving arm 170 and at their opposite ends to respective ones of the pins 190 and 192 bias the left and right projecting pawl ends 198 and 200, FIG. 6, toward the wheel 166. Pin 186 on the right side of cross arm 180 carries a roller 202 for purposes to be explained presently. The portions 198 and 200 of pawls 182 and 184 are angularly cut or beveled such that as one pawl is driving the wheel 166 in one direction, the opposite pawl may ratchet idly over the castellations of the wheel. Each pawl is adapted to be lifted away from the castellations of the wheel 166 by means to be described shortly. In the preferred and illustrated embodiment wheel 166 is provided with twenty equally spaced castellations or teeth disposed around the periphery thereof 18° apart.

Disposed adjacent the periphery of the wheel 166 and beneath the shaft 52 are oppositely disposed left and right anti-backup pawls 204 and 206, FIGS. 6 and 7, each of which is pivoted by means of a pin 208 and a C-ring 210 to a block 212 attached to the rear surface of the front wall member 14 as by screws 214. The upwardly projecting right and left portions 216 and 218, FIG. 6, of pawls 204 and 206 respectively, are biased by a spring 220 toward the teeth of the wheel 166. Spring 220 is trapped between pins 208 and right and left camming pins 222 and 224 on respective pawls 204 and 206. Pins 222 and 224 project beyond the far side of each pawl, as seen in FIGS. 6 and 7, for engagement with the camming surface 226 on main cam 110, for purposes to be explained herein later on. The pawl ends 216 and 218 are cut or beveled so as to permit one pawl to drop in behind a castellation and prevent the wheel from rotating in one direction while the opposite pawl ratchets over the castellations as the wheel rotates in the opposite direction.

As is seen in FIG. 3, the split cam member 110 is disposed immediately adjacent and parallel to the wheel 166 and is press-fitted as beforementioned, on the undercut portion 113 of the front bushing 54. The cam portion 112, FIG. 6, is disposed on shaft 52 adjacent the member 110 and has a portion 228 of which is bent rearwardly and upwardly, FIG. 3, so that its edge 114 can move into confronting abutting engagement with the opposing edge 116 of cam 110 as seen most clearly in the "c" portions of FIGS. 10 through 19 inclusive. The upper edge of each of the cams 110 and 112 is chamfered at a slight angle to provide a respective cam surface 230 and 232. The main cam 110 and split cam 112 of the split cam mechanism 108 are biased toward one another by means of a spring 234 attached at its opposite ends to pins 236 and 238 respectively, which in a manner still to be explained, provide cam and locking means for other associated apparatus.

Immediately in front of the split cam mechanism 108 and adjacent the rear surface of the front wall forming member 14 are located oppositely disposed irregularly shaped main cam latching member 240 and split cam latching member 242, FIGS. 6 and 7, each of which is pivotally mounted to a respective stud 244 projecting rearwardly from the wall 14, each of which is provided with a radial notch 246 and 248 respectively, intermediate its ends. Notch 246 of main cam latch 240 is adapted to seat on pin 236 of main cam 110 in a manner still to be described.

Latch 242 includes a substantially U-shaped end with an arm portion 250 which projects angularly upwardly, FIGS. 6 and 7, for engagement with the roller 202 as will be explained later on. The substantially horizontal portions 252 and 254, see "c" portions of FIGS. 10 through 19 inclusive, of latches 240 and 242, respectively, extend rightwardly and leftwardly into side by side parallel relationship. Latch 240 is biased downwardly by a spring 256 secured at one end to the latch adjacent notch 246 and at its opposite end to a pin 258 projecting from front wall 14. Latch 242 is similarly biased by means of spring 260 attached at one end to the latch adjacent notch 248 and at its other end to a pin 262 in wall 14. The horizontal portions 252 and 254 of the latches 240 and 242 are each provided with lower cam surfaces 268 and 270 respectively, FIGS. 10–19 inclusive, for purposes to be explained herein shortly.

Pivotally mounted on a short stud 272, FIG. 7, secured to the wall 14 for rocking movement arcuately upwardly and downwardly is an L-shaped switch actuating arm or link 274, the vertically projecting end 276 of which is engageable with the actuating lever 278 of a momentary, snap action switch such as a "Microswitch" 280 attached by screws 282 to wall 14. A spring 284 normally biases arm 274 away from lever 278. The lower edge portion of the arm 274 is provided with an angularly depending cam member 286 intermediate its ends, projecting into the path of movement of the camming projection 118 at the upper end of the main cam 110. Each time the split cam mechanism 108 reverses its position from right to left or vice versa, the projection 118 will engage the cam 286 lifting arm 274 upwardly causing arm 278 to depress plunger 288 closing the contacts 289, 289' of microswitch 280 in a manner seen most clearly in FIGS. 10 through 19 inclusive, as will be explained herein later on.

The operation of the counting mechanism will now be described with particular reference to FIGS. 10 through 19 inclusive, wherein there is set forth an example of a step-by-step movement in a clockwise and counterclockwise direction not necessarily in that order as exemplified by a typical counting operation involving a batch or item count of "two" in a clockwise or counterclockwise direction. While it is an object of the present description to illustrate and demonstrate how the mechanism can count in two directions, it should be apparent that the "counting" may be considered as addition and/or subtraction depending on the specific use to which the apparatus may be put as well as the direction of movement of certain parts thereof. It is to be understood in this connection, that the so-called counter 130 does not count in the true sense of the word, but, simply indicates the end of the "count" or the total which has been pre-set therein so that the operator of the apparatus may have a visual indication of the desired number used or the size of the batch counted, etc. in the particular operation of the equipment with which the present apparatus is to be employed.

It should be noted that FIGS. 10 through 19 of the drawings each include three separate views. The first or lefthand view in each figure identified hereinafter as "a" is substantially similar to FIG. 9 with some of the details thereof excluded for purposes of clarity. The central view in each of these figures identified as "b" is a view along the line 6—6 of FIG. 3 and is similar to FIG. 6. The righthand view in each of these figures identified as "c" is a view along the line 7—7 of FIG. 3 and is similar to FIG. 7.

Let it be assumed in the first instance that the apparatus of the present invention is in the condition shown in FIGS. 10a, b and c, reading from left to right in the drawings, with the switch 280 "open," i.e., de-energized.

Reversing arms 64 and 66 fixed to shaft 52 and disposed therealong a fixed distance apart along the helix for example, 90°, are in the relative positions seen in FIG. 10a with outboard arm 66 contacting pin 84 on rider 80. Rider 80 and gear 70 are free to move along the helical axis 62 of shaft 52. The pawl driving arm 172, FIG. 10b, is cocked slightly to the right with the left pawl 182 disposed behind the darkened tooth 290. Roller 202 is holding arm 250 angled upwardly and simultaneously preventing the notch 248, FIG. 10c, on split cam latch 242 from seating on pin 238 on the split cam member 112. Anti-backup pawl 218 is engaged with tooth 292 on the wheel 166 preventing the latter from rotating in a clockwise direction. Anti-backup pawl 216, FIG. 10c, is prevented from engaging the teeth by the lower cam surface 226 of cam 110 which presses against the pin 222 on pawl 216 depressing the latter. Contacts 289–289' of switch 280 are open since the cam protuberance 118 of cam 110 is angularly disposed relative to the operate cam 286 on arm 274 inactivating the same.

Intermittent rotation of the main driving shaft 20 by means earlier referred to herein causes the driving link 172 to be pushed alternately leftwardly, FIG. 11, and then rightwardly. The leftward excursion of pawl driving arm 170 causes pawl end 198 to engage tooth 290 pushing the wheel 166 counterclockwise in the direction of arrow 294, a distance of one tooth or 18° to the position shown. Simultaneously, roller 202 is moved leftwardly, FIG. 11b, away from arm 250 permitting spring 260 to move the latch 242 downwardly bringing its notch 248 into engagement with the pin 238 on the split cam 112. Pin 192 on pawl 184 rides up on the cam surface 232 of the cam 112 carrying the pawl 184 upwardly out of contact with the teeth on wheel 166 into a position abutting the side of switch activating cam 118 where it is held tightly by spring 194. Anti-backup pawl 218 is now contacting the next adjacent tooth 296 on wheel 166 while anti-backup pawl 216 is still being held away from the wheel by the cam surface 226, as earlier referred to herein.

Movement of wheel 166 causes arms 64 and 66 on shaft 52 to move counterclockwise 18°. Rider 80 moves axially away from arm 66 as arm 66 moves angularly away from pin 84, FIG. 5, while arm 64 contacts pin 76 on wheel 70. Rider 80 and gear 70 being provided with threaded bores as earlier described, move axially along the helix 62. Rider 80 is constrained to move in a linear direction by shaft 88 while gear 70 is prevented from rotating about the shaft 52 by gear 142, FIGS. 2, 4 and 5. Rotation of shaft 52 in a counterclockwise direction causes rider 80 and gear 70 to be screwed along the helix 62 as both arms 64 and 66 rotate with shaft 52, as gear 70 moves closer to the arm 64, while arm 66 moves away from rider 80, thereby enabling the apparatus to move one step or "count."

The mechanism is reset, FIG. 12, for the next "count" by the rightward motion of link 172 which moves the pawl driving arm 170 clockwise, carrying pawls 182 and 184 rightwardly, thereby to set up the apparatus for the second cycle or step of the counting operation. Switch 280 still is in its "open" condition. Roller 202 pushes arm 250 arcuately upwardly, disengaging notch 248 from pin 238 on the split cam 112. Pawl end 198 ratchets across the teeth of the wheel 166 while pawl 184 is raised over the teeth of wheel 166 by means of the pin 192 thereon, which rides up on cam surface 230 of cam member 112 preventing the pawl end from contacting the periphery of the wheel 166 and driving it in a clockwise direction. Arms 64 and 66 are not moved during this time interval. Anti-backup pawl 218 engages tooth 296 of wheel 166 further preventing movement of the wheel in a clockwise direction.

FIGS. 13a, b and c, illustrate the movement of the split cam mechanism 108 splitting or separating cam portion 112 from main cam 110. Switch 280 is initially open as in FIG. 10. Rotation of shaft 20 causes link 172 to push pawl driving arm 170 leftwardly. Roller 202 is likewise moved leftwardly away from the angled arm 250 of latch arm 242 permitting the latch 242 to drop causing notch 248 to engage pin 238 on cam 112 under the urging of spring 260 thus to lock the split cam 112 against further movement. Pawl 182 on arm 170 contacts tooth 300 moving toothed wheel 166 counterclockwise arrow 294, by a distance substantially equivalent to 18°, moving black tooth 300 from the position of FIG. 14b to the position of FIG. 15b. Pin 192 on pawl 184 rides up on the camming surface 232 of cam 112, pushing the pawl in an upwardly direction above the periphery of the toothed wheel 166 where it is held in close relationship by means of the spring 260 out of the path of the teeth of the wheel.

Movement of the toothed wheel 166 causes arms 64 and 66, arm 64 pushing against pin 76 on gear 70, to rotate together counterclockwise 18°. Rotation of gear 70 causes rotative torque to be applied to gear 142, FIG. 9, which is being held by latch 148 at the end thereof and thus cannot rotate. However, this rotative force moves the framework 86, FIGS. 3 and 20, including shaft 88, rider 80 and cam portion 110 arcuately as an assembly in a counterclockwise direction, FIG. 20, by a distance substantially equivalent to 9°. There must be sufficient arcuate motion or travel of the pawls for each to engage behind the tooth with which it is operably associated, thus each time the pawls travel arcuately left and right a distance equivalent to slightly more than one circular pitch on the tooth but less than two, there is thus approximately a 9° lost motion in so far as the cam 110 is concerned. Since split cam 112 is held against movement, as aforedescribed, main cam 110 separates therefrom (9°). The upper cam protuberance 118 on cam 110 thereupon engages the cam 286 moving arm 280 upwardly momentarily, closing switch 280 during the 9° travel of cam 110 and indicating by a pulse output therefrom that the count of "two" has been reached. The counter mechanism 130 is now standing at the indicated count of "two" or "zero" for the next batch, FIG. 2. When cam 110 travels leftwardly the lower cam surface 226 of cam 110 has now left pin 222 of anti-backup pawl 204 permitting the end 216 of the pawl to drop onto the tooth root of wheel 166, and removing pawl 206 away from wheel 166. As seen in FIG. 13c, split cam 112 is held away from cam 110 by latch 242, thereby preventing pawl 184 from driving ratchet 166 clockwise during the return stroke of member 170 to its righthand position FIG. 14b.

However, as member 170 returns to its righthand position member 202 lifts member 242 so that member 112 is released to be pulled to the left against member 110 by means of spring 234. Latch 240 functions to eliminate the possibility of spring 234 pulling arm 110 back before cam 112 goes over to meet it. When cam 112 does meet member 110 it lifts latch 240 upwardly thereby to enable cam 112 to be moved back again at the end of the batch cycle.

Cam 110 is next moved rightwardly, FIG. 14c, so as to fully separate from cam 112 thereby to re-operate momentarily switch 280 which is normally open. In effecting this operation link 172 drives pawl driving arm 170 leftwardly, FIG. 14b enabling pawl 182 to engage tooth 300, and drive wheel 166 counterclockwise a distance of 18° to complete the cycle of the second count. Pin 192 on pawl 184 rides further up on cam surface 232 of cam 112 keeping the pawl above the periphery of the teeth of the wheel 166 to be held in close relationship thereto by means of spring 194. The pin 238 in notch 248 of camming latch 242 is still preventing cam 112 from moving. With the movement of the wheel 166, arm 64 pushes against pin 76 to rotate the frame assembly as a unit 9°. The cam portion 110 is now separated from cam 112 to its clockwise position as seen in FIG. 14c. The upper cam surface 118 leaves cam 286 on arm 274 thereby opening switch 280 as aforedescribed. Pin 236 on main cam 110 moves into notch 246 on main cam latch 240 locking the cam against any subsequent movement, e.g., due to forces exerted by spring 234.

It is seen that latch 242 with its notch 248 engaged with pin 238 is still maintaining the cam portions 110–112 in a separated condition, FIG. 14c. The lower cam surface 226 of cam 110 pushes pin 224 on the anti-backup pawl 206 downwardly out of the path of movement of the teeth of the wheel 166. Anti-backup pawl 204 is engaged with tooth 302 of the wheel 166 preventing the wheel from moving.

Drive shaft 20 is now returned to its starting position with the switch open resetting the apparatus for the next cycle of counting as before. In effecting this operation as seen in FIG. 15a through c, link 172 pulls arm 170 and with its pawls 182 and 184 in a clockwise direction. The end 198 of pawl 182 is lifted over the teeth of the wheel 166 by means of pin 190 riding up over cam surface 230 of the cam 110 forcing pawl 182 in an upward direction.

Simultaneously, the end 200 of pawl 184 was lifted over the teeth of wheel 166 by pin 192 riding over cam surface 232 on the cam 112 while the cam was split as in FIG. 14c, so that the end 200 of the pawl 184 comes to rest on the tooth root of wheel 166. Roller 202 of arm 170 pushes against arm 250 in a clockwise direction to cause notch 248 on arm 242 to disengage from pin 238 on cam 112 releasing the latter.

Spring 234 now snaps cam 112 clockwise, so that surfaces 114 and 116 abut each other. Pin 238 on cam 112 rides along the lower surface 270 of arm 242 pushing latch 242 upwardly and moving arm 250 substantially out of contact with the roller 202, to place the apparatus in the same relative position shown in FIG. 10. As a result of this movement pin 238 also engages cam surface 268 of latch 240 causing the latter upwardly to disengage pin 236 from notch 246 to reverse cam 110, FIG. 15c, for the reverse counting operation to be described subsequentially herein.

As seen in FIG. 15c, anti-backup pawl 216 keeps toothed wheel 166 from moving in a clockwise direction. Roller 202 retains arm 250 in a retracted upward position so that arm 250 performs no function in the next counting operation since the cams 110 and 112 do not split apart as before. The split cam mechanism 108 thus is seen to perform the function of preventing motion of the toothed wheel 166 by lifting the pawl 182 away from the teeth of the wheel. It is noted in FIG. 14 that the counting cycle is finished but the drive shaft 20 is a half revolution from its starting position since one half revolution of the shaft does the driving while the other half revolution it is idling. The motion described in detail in FIG. 15 permits the shaft 20 to be moved to its original position where it can now begin the count in the opposite direction as shown in FIGS. 16 through 19, if such is desired.

As seen in FIG. 16, when link 172 pushes pawl driving arm 170 leftwardly pawl 184 ratchets over the teeth of wheel 166. Pin 190 on pawl 182 rides down cam 230 to place the pawl in front of tooth 300 on wheel 166. Cam surface 226 of cam 110 still engages pin 224 on anti-backup pawl 206 while pawl 204 is in contact with tooth 302 thus preparing the mechanism for its first clockwise step.

When link 172 moves rightwardly, FIG. 17, pin 190 rides completely up upon cam 230 lifting pawl 182 away from the wheel 166. Simultaneously, pawl 184 engages tooth 304 rotating wheel 166 clockwise 18°. At the same time arm 66 moves into contact with pin 84 on arm 80 while arm 64 leaves pin 76 on wheel 70.

The reverse excursion leftwardly of link 172, FIG. 18, causes pawl end 200 to ratchet over the next adjacent counterclockwise tooth while pin 190 on pawl 182 rides down cam 230 so that pawl end 198 falls in behind tooth 306 preparatory to advancing wheel 166 for the clockwise count of "two."

As link 172 moves rightwardly, FIG. 19, pawl end 200 engages tooth 308 rotating wheel 166 18°. This movement causes arm 66 pinned to shaft 52 to push pin 84 effectively moving arm 80 and shaft 88 clockwise causing arm 64 to separate from pin 76. Likewise the split cam assembly 108 is shifted clockwise. This clockwise motion of the split cam mechanism moves protuberance 118 of cam 110 clockwise closing the contacts of switch 280 sending out a pulse as before, indicating that the count of "two" has again been reached. The ratchet wheel 166 has now completed two steps and in so doing causing shaft 88 to be flipped in the opposite direction thus reorienting the ratchet wheel and associated mechanism for counting in a counterclockwise direction. From the foregoing it is noted that the reversing stroke takes place on the second half of the cycle but in going in the opposite direction the reversing takes place on the first half of the cycle. The second half is merely the return of the pawl. This results by reason of the use of two pawls, one of which is driving and one of which is idling. Since they are pointing in different directions one has to drive on the opposite half cycle from which the other one drives. Now it is apparent that if the ratchet were stopped in the wrong position, there would be a chance of arriving at an extra count or of dropping a count. The split cam mechanism avoids this discrepancy by permitting the device to gain or lose a half a count from a clockwise to a counterclockwise counting direction or vice versa. Thus the split cam mechanism accomplishes this by prolonging the disabling of one of the driving pawls permitting the pawl to be overridden in order to pick up the half a revolution.

As an example, in the case which has been described hereinbefore, of the count of two, once the count of two has been reached, the driving pawl is disabled and the mechanism is flipped in the opposite direction to begin driving in a clockwise direction. However, since it is beng turned over on the first half of the cycle if the cam were to flop inasmuch as this is the cycle in which the mechanism is going to work in reverse, it would normally disable the driving pawl on the reverse stroke. The pawl that is idling in the present instance would be allowed to fall in during this first half of the stroke and then on the second half of the stroke the drive would be performed in the other direction. However, since the count of "two" has already been made in a different direction, and it is not desirable to start counting another one in the opposite direction on the same cycle, since this would effect a stepwise movement e.g., count in the opposite direction, the split cam comes into play and the half to the right remains fast to keep the idling pawl disabled for the other half of the cycle. Then, on the last portion of the cycle, the split cam snaps across under the influence of the spring fastened to the main cam to enable the previously idling pawl now to drive the ratchet wheel in the opposite direction.

It is noted that as earlier pointed out herein, the two reversing arms are a fixed distance apart along the helix and both the reversing arms are pinned to the main shaft. The distance between the arms along the helix is a fixed helical distance. However, the distance between the pin on the rider and the pin on gear 70 can be varied or adjusted by means of the batch count latch and the gear 136 as earlier described. Thus the helical distance between the two pins 76 and 84 subtracted from the helical distance between the reversing arms 64 and 66 will total the count, minus the distance travelled during one count, whatever it is, at any stage in its travel. This is the time during which there is no travel along the helix of the rider 80 and the gear 70. That distance is equal to the distance from the rider pin 84 to its reversing arm 66 plus the distance from the gear pin 76 to its reversing arm 64. Thus, the apparatus is counting a helical distance in increments. Now the helical distance through which the mechanism travelled before reversing is equal to the helical distance between the pin 84 on the rider 80 and its associated reversing arm 86 plus the helical distance between the pin 76 on the gear 70 and its reversing arm 64. The exposed portion of the helix or screw between the gear and the rider is a constant distance until the size of the batch count is changed. This distance can be varied to vary the batch count. This figure when subtracted from the entire helical distance between the two reversing arms, disregarding the thickness of the hubs and other materials, is equal to the total of the two other distances between the pins and the respective reversing arms.

What is claimed is:
1. A step-by-step mechanical movement comprising,
(a) a rotatable shaft,
(b) means for rotatably driving said shaft in one or the other of two opposite directions,
(c) oppositely disposed pre-settable means operably associated with said shaft and movable therealong as said shaft is rotated for varying the number of steps or revolutions of said shaft, and,
(d) means operably interengaging said pre-settable means and said driving means effective to reverse the direction of movement of said driving means at the termination of a preselected excursion of said pre-settable means along said shaft in one or the other of said opposite directions.

2. A step-by-step mechanical movement comprising,
(a) a rotatable shaft,
(b) means for rotatably driving said shaft in one or the other of two opposite directions,
(c) oppositely disposed pre-settable means operably associated with said shaft and movable therealong as said shaft is rotated for varying the number of steps or revolutions of said shaft,
(d) means operably interengaging said pre-settable means and said driving means effective to reverse the direction of movement of said driving means at the termination of a preselected excursion of said pre-settable means along said shaft in one or the other of said opposite directions, and,
(e) means operably engageable with said reversing means for indicating the termination of the rotative movement of said shaft.

3. A step-by-step mechanical movement comprising,
(a) a rotatable shaft,
(b) means for rotatably driving said shaft in one or the other of two opposite directions,
(c) oppositely disposed pre-settable means operably associated with said shaft and movable therealong as the shaft is rotated for varying the number of steps or revolutions of said shaft,
(d) means operably interengaging said pre-settable means and said driving means effective to reverse the direction of movement of the driving means at the termination of a preselected excursion of said pre-settable means along said shaft in one or the other of said opposite directions, and
(e) means operably engageable with said reversing means for indicating the termination of the rotative movement of said shaft,
(f) said last means including means for zeroizing said indicating means.

4. A step-by-step mechanical movement comprising,
(a) a rotatable shaft,
(b) means for rotatably driving said shaft in one or the other of two opposite directions,
(c) oppositely disposed pre-settable means operably associated with said shaft and movable therealong as the shaft is rotated for varying the number of steps or revolutions of said shaft,
(d) means operably interengaging said pre-settable means and said driving means effective to reverse the direction of movement of the driving means at the termination of a preselected excursion of said pre-settable means along said shaft in one or the other of said opposite directions,
(e) means operably engageable with said reversing means for indicating the termination of the rotative movement of said shaft, and,
(f) means providing an electrical signal output in response to the aforesaid termination of rotation of said shaft.

5. A step-by-step mechanical movement comprising,
(a) a rotatable shaft,
(b) a toothed wheel carried by said shaft and rotatable therewith,
(c) means engageable with the teeth of said wheel for rotatably driving said shaft in one or othe other of two opposite directions,
(d) oppositely disposed pre-settable means operably associated with said shaft and movable therealong as said shaft is rotated for varying the number of steps or revolutions of said shaft,
(e) means operably interengaging said pre-settable means and said driving means for reversing the direction of movement of the drive means at the termination of a preselected excursion of said pre-settable means along said shaft in one or the other of said opposite directions,
(f) means operably engageable with said reversing means for indicating the termination of the rotative movement of said shaft, and,
(g) means operably associated with said presettable means and said drive means effective to cause said drive means to repeat said movement after the termination of each operation in a desired direction.

6. A step-by-step mechanical movement comprising,
(a) a rotatable shaft,
(b) a toothed wheel carried by said shaft and rotatable therewith,
(c) means engageable with the teeth of said wheel for rotatably driving said shaft in one or the other of two opposite directions,
(d) oppositely disposed pre-settable means operable associated with said shaft and movable therealong as said shaft is rotated for varying the number of steps or revolutions of said shaft,
(e) means operably interengaging said pre-settable means and said driving means for reversing the direction of movement of the drive means at the termination of a preselected excursion of said pre-settable means along said shaft in one or the other of said opposite directions,
(f) means operably engageable with said reversing means for indicating the termination of the rotative movement of said shaft,
(g) means operably associated with said pre-settable means and said drive means effective to cause said drive means to repeat said movement after the termination of each operation in a desired direction, and,
(h) means providing an electrical signal output in response to the aforesaid termination of rotation of said shaft.

7. A step-by-step mechanical movement comprising,
(a) a rotatable threaded shaft,
(b) a toothed wheel carried by said shaft and rotatable therewith,
(c) means engageable with the teeth of said wheel for rotatably driving said shaft in one or the other of two opposite directions,
(d) oppositely disposed pre-settable means operably associated with said shaft and movable along the threaded portion thereof as said shaft is rotated effective to vary the number of steps or revolutions of said shaft,
(e) cam means including means operably interengaging said pre-settable means and said driving means for effectively reversing the direction of said drive means at the termination of a preselected excursion of the pre-settable means along the threaded portion of said shaft in one or the other of said opposite directions,
(f) means operably engageable with said reversing means for visibly indicating the termination of the rotative movement of said shaft, and,
(g) means providing an electrical signal ouput in response to the aforesaid termination of rotation of said shaft.

8. A step-by-step mechanical movement comprising,
(a) a rotatable shaft having a threaded helix intermediate its ends,
(b) a toothed ratchet wheel secured to one end of said shaft,
(c) means engageable with said ratchet wheel for rotatably driving said shaft in one or the other of two opposite directions,
(d) a pair of members threadedly movable along said helix relative to one another,
(e) one of said pair of members being adjustable relative to the other of said members effective to vary the number of steps of said wheel, (f) cam means operably associated with said ratchet wheel, (g) means operably interengaging one or the other of said pair of members and said cam means effective to thereby reverse said driving means at the termination of a preselected excursion of said pair of members relative to one another along said helix, (h) means operably associated with said cam means providing a power takeoff for actuating a ultilization device, and, (i) means actuated by said cam means providing an electrical output signal indicative of the termination of the step-by-step movement of said shaft in one or the other of said opposite directions.

9. A step-by-step mechanical movement comprising, (a) a rotatable shaft journalled at opposite ends and provided with a threaded helix intermediate said ends, (b) a toothed ratchet wheel secured to one end of said shaft, (c) a pawl driving arm carrying oppositely disposed pawls thereon engageable with the teeth of said ratchet wheel, (d) means connecting said pawl driving arm to a source of power for rocking said pawl driving arm thereby rotating said ratchet wheel to drive said shaft, (e) cam means rockably mounted on said shaft and including means operably associated with said pawl driving arm for changing the direction of drive of said pawls, (f) a rockable frame operably associated with said cam means effective in one position to cause said pawl driving arm to drive said shaft in one direction and in another position to cause said pawl driving arm to drive said shaft in the opposite direction, (g) means threadedly movable along said helix to a position to engage said frame for effecting rocking movement thereof in a direction to cause said cam means to reverse the direction of movement of said ratchet wheel and thus the direction of movement of said shaft, (h) means operably interengaging said frame and said cam for changing the relative position along said helix of said means threadedly engaging the same for varying the number of steps or revolutions of said shaft, and (i) means operably associated with said frame and said cam means for providing an electrical output pulse at the termination of the rotative movement of said shaft.

10. The invention according to claim 9 wherein said cam means includes a pivotally mounted cam portion operably associated with said cam means and biased theretoward in jaw-like fashion for arcuate movement toward and away therefrom.

11. Mechanical motion generating apparatus comprising, (a) a rotatable shaft including a portion intermediate its ends having a plurality of threads thereon, (b) a drive wheel pinned to and rotatable with said shaft, (c) oppositely disposed driving pawls selectively engageable with said drive wheel for rotating the latter in one or the other of two opposite directions, (d) drive means for effecting movement of one or the other of said pawls, (e) cam means adjacent said drive wheel operably engageable with said pawls for enabling one of said pawls and disabling the opposite pawl during each actuation of said drive means, (f) oppositely disposed stop means pinned to and movable with said shaft adjacent opposite ends of the threaded portion thereof, (g) a wheel threadedly disposed on said shaft adjacent one of said stop means, (h) a clevis threadedly disposed on said shaft adjacent the other of said stop means, (i) means engageable with said cam means constraining said clevis to move rectilinearly along the threads of said shaft, (j) means engageable with said cam means constraining said wheel to move rectilinearly along the threads of said shaft, and (k) electrical output means operatively engageable with said cam means and actuatable thereby to produce a signal output therefrom when said wheel or said clevis engages a respective one of said stop means thereby to cause said cam means to move arcuately in a direction so as to reverse said drive means.

12. Mechanical motion generating apparatus comprising, (a) a rotatable shaft including a portion intermediate its end having a plurality of threads thereon, (b) a castellated drive wheel pinned to and rotatable with said shaft, (c) oppositely disposed driving pawls selectively engageable with the castellations of said drive wheel for rotating the latter in one or the other of two opposite directions, (d) a reciprocable driving means connected to a source of torque for effecting movement of one or the other of said pawls, (e) cam means adjacent said drive wheel including means operably engageable with said pawls for enabling one of said pawls and disabling the opposite pawl during each actuation of the drive means, (f) oppositely disposed reversing means pinned to and movable with said shaft disposed adjacent opposite ends of the threaded portion thereof, (g) a rotatable wheel threadedly disposed on said shaft adjacent one of said reversing means, (h) a clevis threadedly disposed on said shaft adjacent the other of said reversing means, (i) frame means engageable with said cam means including means for constraining said clevis to move rectilinearly along the threads of said shaft, (j) means engageable with said cam means and said frame means for constraining said wheel to move rectilinearly along said shaft relative to said clevis, and, (k) electrical output means operably engageable with said cam means and actuatable thereby to produce a signal output therefrom when a respective one of said reversing means engages said wheel or said clevis thereby shifting said frame means causing said cam means to move arcuately in a direction to reverse said drive means.

13. Mechanical motion generating apparatus comprising, (a) a rotatable shaft including a portion intermediate its ends provided with a plurality of threads thereon forming a helix, (b) a castellated drive wheel pinned to and rotatable with said shaft, (c) oppositely disposed driving pawls selectively engageable with said castellations and said drive wheel for rotating the latter in one or the other of two opposite directions, (d) a reciprocable drive means connected to a source of torque for effecting movement of one or the other of said pawls, (e) cam means adjacent said drive means including means operably engageable with said pawls for enabling one of said pawls and disabling the opposite pawl during each activation of said driving means, (f) oppositely disposed reversing means pinned to and movable with said shaft adjacent opposite ends of the threaded helix thereof, (g) a wheel threadedly disposed on said shaft adjacent one of said reversing means and carrying a projection thereon, (h) a clevis threadedly disposed on said shaft adjacent the other of said reversing means and carrying a projection thereon, (i) frame means engageable with said cam means including means constraining said clevis to move rectilinearly along the threads of said shaft, (j) means engageable with said cam means and said frame means for constraining said wheel to move rectilinearly along the threads of said shaft relative to said clevis, and, (k) electrical output means operably engageable with said cam means and actuatable thereby to produce a signal output therefrom when a respective one of said reversing means engages a projection on said wheel or said clevis thereby enabling said reversing means to shift said frame means so as to cause said cam means to move arcuately in a direction to reverse said drive means.

14. Mechanical motion generating apparatus comprising, (a) a rotatable shaft including a portion intermediate its ends having a plurality of threads thereon, (b) a toothed drive wheel pinned to and rotatable with said shaft, (c) oppositely disposed driving pawls selectively engageable with the teeth of said toothed drive wheel for rotating the latter in one or the other of two opposite directions, (d) drive means connected to a source of torque for effecting movement of one or the other of said pawls, (e) cam means adjacent said drive wheel including means operably engageable with said pawls for enabling one of said pawls or disabling the other of said pawls during each actuation of said drive means, (f) oppositely disposed reversing means pinned to and movable with said shaft adjacent opposite ends of the threaded portion thereof, (g) a wheel threadedly disposed on said shaft adjacent one of said reversing means, (h) a clevis threadedly disposed on said shaft adjacent the other of said reversing means, (i) frame means engageable with said cam means including means constraining said clevis to move rectilinearly along said threads of said shaft, (j) an indicating mechanism operably engaging said frame and said wheel for indicating the termination of the step-by-step rotation of said shaft and operable to constrain said wheel to move rectilinearly along the threads of said shaft relative to said clevis, (k) latching means operably engaging said frame and said indicating mechanism permitting the number of step-by-step movements of said shaft to the varied at will, and, (l) electrical output means operably engageable with said cam means and actuatable thereby to produce an electrical signal output therefrom when a respective one of said reversing means engages said wheel or said clevis thereby enabling said reversing means to shift said frame means to cause said cam means to move arcuately in a direction to reverse said driving means.

References Cited in the file of this patent
UNITED STATES PATENTS

| | | |
|---|---|---|
| 2,933,931 | Lisinski | Apr. 26, 1960 |
| 2,983,155 | Norton et al. | May 9, 1961 |
| 3,020,774 | Kullmann | Feb. 13, 1962 |